UNITED STATES PATENT OFFICE.

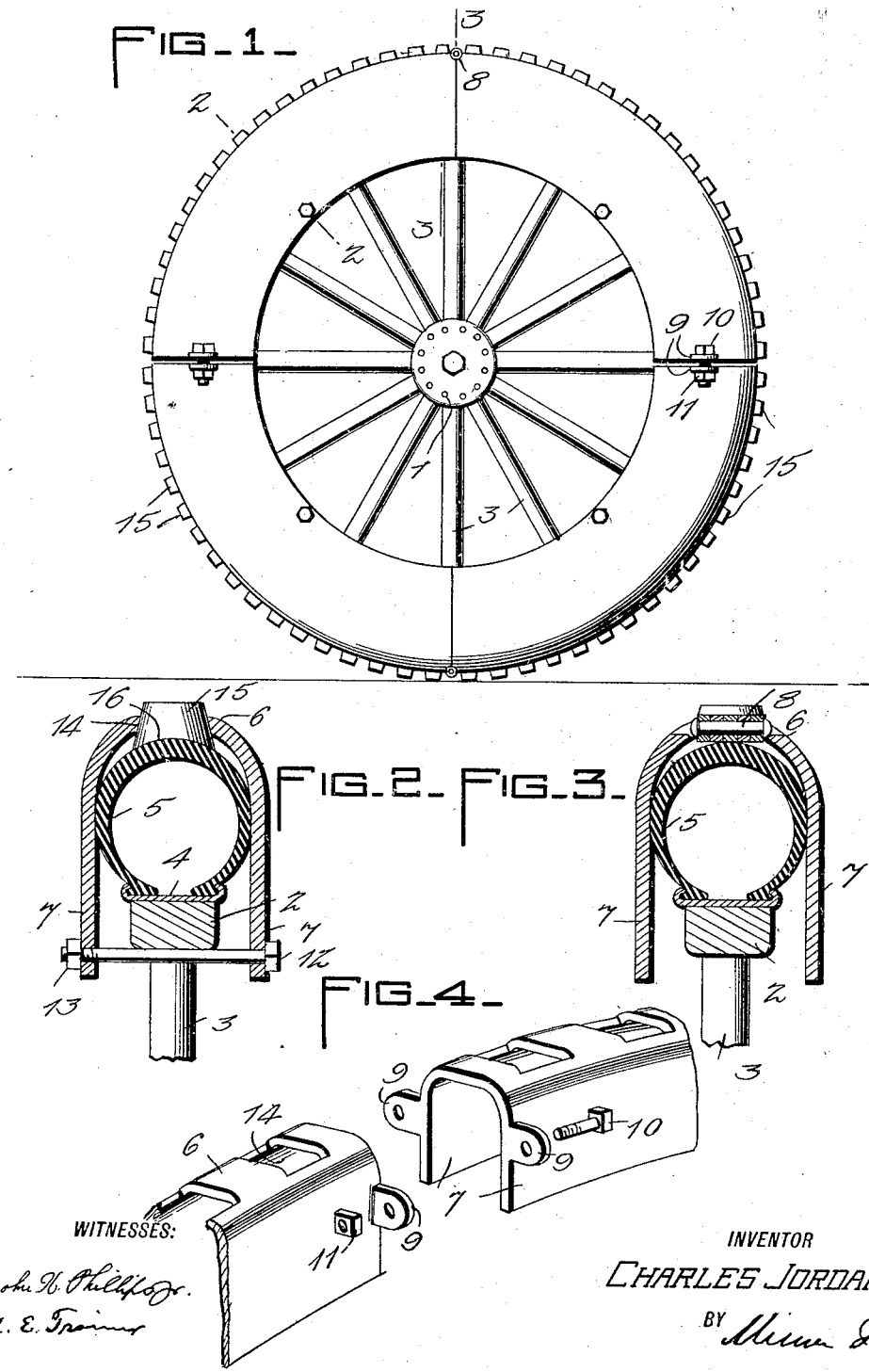

CHARLES JORDAN, OF PITTSBURGH, PENNSYLVANIA.

TIRE-PROTECTOR.

1,199,562.   Specification of Letters Patent.   Patented Sept. 26, 1916.

Application filed April 15, 1916.   Serial No. 91,323.

*To all whom it may concern:*

Be it known that I, CHARLES JORDAN, a citizen of the United States, and a resident of Pittsburgh, in the county of Allegheny and State of Pennsylvania, have invented a new and useful Improvement in Tire-Protectors, of which the following is a specification.

My invention is an improvement in tire protectors, and has for its object to provide a device for use in connection with rubber tires for preventing injury and wear of the tires without impairing the resiliency thereof, wherein a sectional casing is provided substantially U-shaped in cross section for engaging over the tire and having means for permitting the casing to be secured in place on the wheel, and wherein the casing is provided with openings in its peripheral surface for receiving tread blocks for engaging the roadway, the openings and the blocks being shaped to limit the outward movement of the blocks.

In the drawings:—Figure 1 is a side view of a wheel provided with the improved protector, Figs. 2 and 3 are sections on the lines 2—2 and 3—3, respectively, of Fig. 1, Fig. 2 looking in the direction of the arrows adjacent to the line, and Fig. 4 is a partial perspective view of the protector.

The present embodiment of the invention is shown in connection with a wheel of ordinary construction, comprising the usual hub 1, the felly 2, and the spokes 3 connecting the hub and the felly, and the felly is provided with the usual rim 4, supporting a pneumatic tire 5.

A sectional casing is provided, the said casing being approximately channel or U-shaped in cross section, and consisting of a body or tread 6, and side walls 7. The body or tread is curved transversely and the side walls are spaced apart enough to receive the tire 5 between the said walls as shown in Figs. 2 and 3, and the said walls are of a depth sufficient to extend their inner edges to the felly when the protector is in place on the wheel. Each of the sections of the casing consists of similar portions which are hinged together at their adjacent ends by means of a hinge connection 8, the hinge being so arranged that the portions of the sections may swing outwardly at their remote ends away from the wheel or inwardly to a position such that the adjacent ends of the portions of the sections abut. Each section is semi-circular and when the sections are in place and connected in a manner to be presently described, the tire will be completely inclosed and protected. Each of the sections is provided at its ends with outwardly extending perforated lugs 9, the said lugs being on the side walls 7, and the lugs of the sections register for receiving holding bolts 10, which are passed through the openings of the lugs and engaged by nuts 11 to clamp the sections together on the wheel. The protector is further held on the wheel by means of bolts 12, which are passed through registering openings in the side walls 7 of the sections near their inner edges, the said bolts passing on the inner face of the felly as shown, and each bolt is engaged by a nut 13 at the opposite face of the wheel. Four bolts 12 are provided, the said bolts being at the centers of the portions of the sections.

The body 6 of each section is provided with a series of transverse slots or openings 14, and tread blocks 15 are held in these openings. Each block as shown more particularly in Fig. 2, is elliptical in cross section and tapering, the inner end being concave transversely of the protector and longitudinally of the block as shown at 16 to fit the tread of the tire 5. The slots or openings 14 are shaped to fit the peripheral walls of the blocks, and the outer or small ends of the blocks are plane, the said ends being adapted to engage the roadway. The blocks are of a sufficient depth from end to end such that they may be pressed inwardly far enough to utilize the full resiliency of the tire without becoming disengaged from the openings 14, and the taper or bevel of the openings and the peripheral surfaces of the blocks limits their outward movement. The parts are so arranged that when the tire is inflated the blocks will occupy the position shown in Fig. 2, that is, they will be held with their peripheral surface in contact with the edge of the openings.

In use, the body or tread of the protector casing will never engage the ground, the tread blocks taking all the wear and when the blocks become worn or injured they may be removed and replaced. To remove the protector it is only necessary to remove the bolts 12, and the bolts 10 after which each section may be lifted away from the tire or the portions of each section may be turned back on the hinge connections 8.

These connections as shown are formed by interengaging bearing lugs on the ends of the portions which have registering openings for receiving the panel which connects the portions. All of the wear due to direct contact with the roadway is on the tread blocks, and there is no possibility of danger of the tire. In addition the blocks prevent skidding and increase the tractive power of the wheel.

I claim:—

A tire protector comprising a channel shaped sectional casing adapted to fit over the tire and to inclose the same and having spaced transverse slots or openings, and tread blocks in the openings, the said blocks being concave at their inner ends to fit the tire, and tapering from the said ends to the outer ends, and the walls of the openings being shaped to fit the blocks and to limit the outward movement thereof with respect to the casing, said sections consisting of similar portions hinged together at their adjacent ends to swing outwardly away from the tire, and means at the adjacent ends of the sections for connecting them together.

CHARLES JORDAN.

Copies of this patent may be obtained for five cents each, by addressing the "Commissioner of Patents, Washington, D. C."